United States Patent
Badger et al.

(10) Patent No.: US 9,916,128 B2
(45) Date of Patent: Mar. 13, 2018

(54) VISUAL AND VOICE CO-BROWSING FRAMEWORK

(71) Applicant: Verizon Patent and Licensing Inc., Arlington, VA (US)

(72) Inventors: Brian S. Badger, Divide, CO (US); David E. Phelps, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 509 days.

(21) Appl. No.: 14/584,562

(22) Filed: Dec. 29, 2014

(65) Prior Publication Data

US 2015/0113409 A1 Apr. 23, 2015

Related U.S. Application Data

(63) Continuation-in-part of application No. 13/894,844, filed on May 15, 2013, now Pat. No. 9,247,060.

(51) Int. Cl.
| | |
|---|---|
| *H04M 3/51* | (2006.01) |
| *G06F 3/16* | (2006.01) |
| *G06F 17/22* | (2006.01) |
| *H04M 7/00* | (2006.01) |

(52) U.S. Cl.
CPC .......... *G06F 3/167* (2013.01); *G06F 17/2247* (2013.01); *H04M 3/5166* (2013.01); *H04M 3/5191* (2013.01); *H04M 7/0012* (2013.01)

(58) Field of Classification Search
CPC ............. H04M 3/5191; H04M 3/5183; H04M 3/5166; H04M 3/5175; H04M 3/5232
USPC ........................ 379/265.02, 265.09
See application file for complete search history.

(56) References Cited

U.S. PATENT DOCUMENTS

| | | | | |
|---|---|---|---|---|
| 6,597,685 B2* | 7/2003 | Miloslavsky | ........ | G06Q 10/107 348/E7.082 |
| 2014/0126714 A1* | 5/2014 | Sayko | ................. | H04M 3/5191 379/265.09 |
| 2014/0126715 A1 | 5/2014 | Lum et al. | | |

* cited by examiner

*Primary Examiner* — Rasha Al Aubaidi

(57) ABSTRACT

A computer system may include logic configured to enable voice-enabled web pages. The logic may be configured to receive a request for a web page that includes Hypertext Markup Language (HTML) content and voice browser content from an HTML browser running on a user device; generate a co-browsing session identifier based on the received request; provide a response to the HTML browser, wherein the response includes the HTML content, the generated co-browsing session identifier, and an instruction to establish a Web Real-Time Communication (WebRTC) connection with an interactive voice response (IVR) system associated with the voice browser content; receive an indication from the IVR system that the WebRTC connection has been established for the co-browsing session identifier; and provide the voice browser content to a voice browser in the IVR system, in response to receiving the indication that the WebRTC connections has been established for the co-browsing session identifier.

20 Claims, 13 Drawing Sheets

VISUAL AND VOICE CO-BROWSING FRAMEWORK

This patent application is a continuation-in-part of U.S. patent application Ser. No. 13/894,844, entitled "CALL CONTROL FOR WEB CALLS" and filed on May 15, 2013, which is hereby incorporated by reference in its entirety.

BACKGROUND INFORMATION

Various technologies exist for voice communication over a network. For example, a user may use a dedicated device, such as a telephone, or software dedicated for voice communication, such as a Voice over Internet Protocol (VoIP) application to participate in voice communication. In another example, a user may participate in voice communication via a browser application. In order to enable voice and video communication in browser applications, an application programming interface (API), referred to as Web Real-Time Communication (WebRTC), has been developed. Voice communication service providers may need to integrate WebRTC functionalities into existing infrastructures.

DETAILED DESCRIPTION OF PREFERRED EMBODIMENTS

Figure 1:
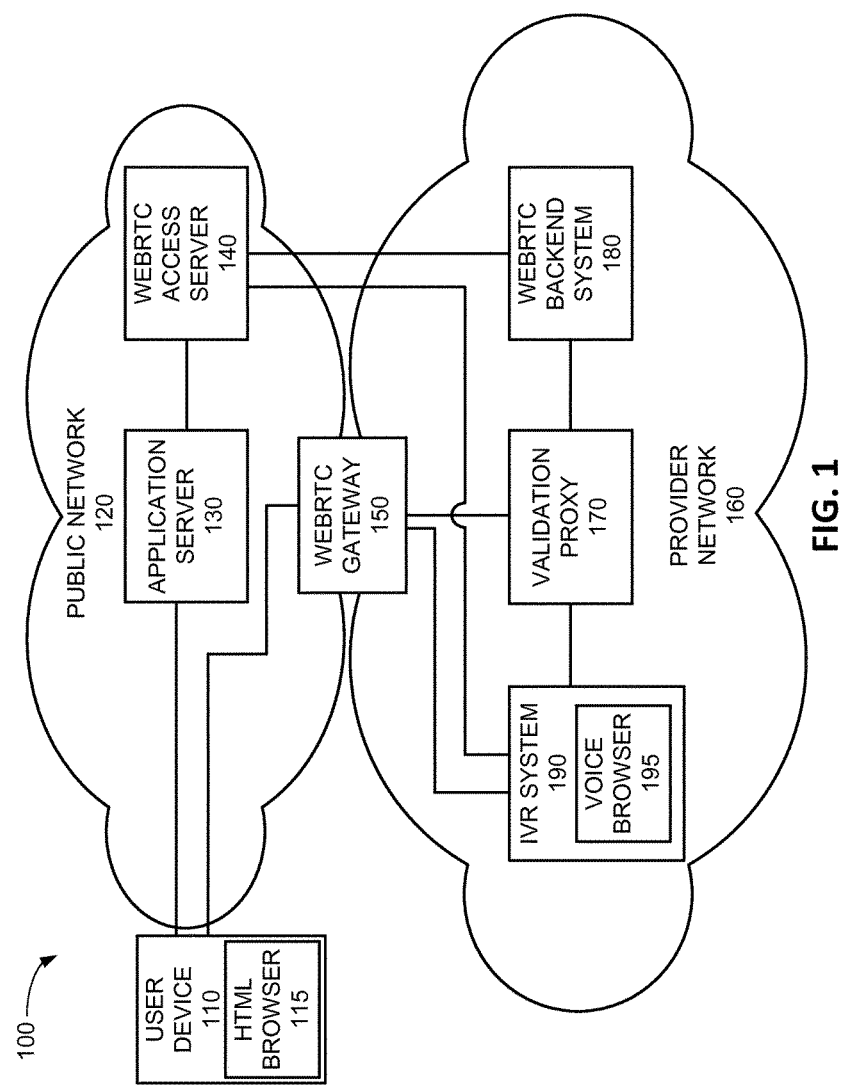
FIG. 1 is a diagram illustrating an exemplary environment according to an implementation described herein.

The following detailed description refers to the accompanying drawings. The same reference numbers in different drawings identify the same or similar elements.

Implementations described herein relate to voice-enabled web pages. A company may provide services via both its web site and call center. To obtain information about the company, sign up for a service, access an account, make a purchase, and/or perform other tasks, a user may use a web browser (e.g., Mozilla Firefox, Microsoft Explorer, Google Chrome, Apple Safari, etc.) to access, at the company site, web pages that are stored as Hypertext Markup Language (HTML) documents.

Furthermore, the company may provide call center services that enable the user to place a call to an automated interactive voice response (IVR) system to obtain information, access an account, request to talk to a customer representative, and/or perform other types of tasks. The IVR system may, for example, provide voice dialog content that includes information and/or prompts that are to be played to the user. The IVR system may also perform voice pattern recognition to recognize utterances made by the user in making a selection. "Voice content," as the phrase is used herein, may refer to audio content and/or video content that is to be played to a user, as well as voice grammars used to analyze audio and/or video received from a user (e.g., in order to identify a selection made by a user) and/or information provided by the user.

The IVR system may access voice content using a voice browser. For example, in some implementations, the voice content may be stored in Voice Extensible Markup Language (VXML) and the voice browser may request VXML content. The voice browser may be implemented in the IVR system, rather than on a user device, because the voice content may require a large amount of storage space that may not be available on the user device. For example, the voice content may include a prompt to the user to provide the user's name and may include voice patterns required to recognize the user's name. As another example, the user may be prompted to provide an address and the voice content may include voice patterns associated with all addresses in a particular geographic area.

Such a company may seek to integrate its web site services with call center services. With a web site integrated with the call center service, when a user visits a web page, for example, the user may hear messages that provide information to the user and/or ask the user to make a selection. As another example, the user may provide input by speaking, rather than by typing or using tactile input. Thus, the user may fill out a form on the web site by following spoken prompts and by speaking the answers into a microphone of a user device used to access the web page, rather than having to type in the answers.

One way to integrate real-time audio with a web page may be to establish a WebRTC connection, or another type of real-time communication connection between a server device hosting the web page and the user device used to access the web page. However, such an implementation may suffer from several drawbacks. For example, a WebRTC connection may need to be established for each new web page, requiring reservation of network resources and a higher network load each time the user visits a new web page. Such repeated connects and disconnects may result in an unreliable real-time communication connection and a poor user experience. Furthermore, implementing the use of a "hotword" during a customer service call may require a continuous audio connection. A hotword, such as uttering "help," or "customer representative," may enable the user to interrupt a voice dialog menu and request connection to a customer representative or to return to a previous voice dialog menu.

Moreover, a real-time connection from a user device to the server device hosting voice dialog content may pose security risks. As an example, the voice dialog content may be directly accessible by a user device and thus a malicious entity could, through repeated automated requests, obtain private information about the users associated with the company. As another example, providing a direct WebRTC connection to a web site server device may leave the company's web site vulnerable to a denial-of-service (DOS) event/attack. Further, if a large number of users request a WebRTC connection within a particular time period, the web site server device may be overwhelmed.

These drawbacks may be avoided by establishing a WebRTC connection between a user device and an IVR system, running a voice browser in the IVR system, and providing the voice content to the IVR system. In order to integrate a web site with the IVR system, an HTML browser session running on a user device may need to be integrated with a voice browser session running on an IVR system that is communicating with the user device via a WebRTC connection. Implementations described herein relate to a visual and voice co-browsing framework. Co-browsing may refer to coordinating an HTML browser session running on a user device and a voice browser session running on an IVR system that is communicating with the HTML browser via a WebRTC connection.

The co-browsing framework may be provided to a customer by a provider of communication services. A "customer," as the term is used herein, may refer to a customer, such as a company, a corporate client, a government agency, and/or another type of business or non-business entity, of a provider of communication services. The provider of communication services may manage a private network that includes an IVR system to handle calls for the customer.

When a user accesses a web page enabled for real-time communication using an HTML browser at an application server, the application server may start a co-browsing session and generate a co-browsing identifier (ID) for the co-browsing session. The co-browsing session ID may be associated with an HTML browsing session ID for the HTML browser. The HTML content of the accessed web page may be provided to the user device, along with the generated co-browsing session ID, a portion of a WebRTC library, and an instruction to establish a WebRTC connection with an IVR system. The user device may use the WebRTC library to establish a connection with the IVR system.

Once the WebRTC connection is established, the IVR system may indicate to the application server that the WebRTC connection for the co-browsing session ID has been established and the application server may provide voice content associated with the web page to the IVR system. For example, the application server may determine the voice content associated with the co-browsing session (e.g., the start page for the voice browser) and inform the IVR system about which voice content should be requested to start a voice browser session. A voice browser running on the IVR system may start a voice browser session associated with the co-browsing session, may associate a voice browser session ID with the co-browsing session ID, and may request the voice content from the application server. The IVR system may then play audio data based on the voice content and send the audio data to the user device over the established WebRTC connection. The user may respond to the audio data over the WebRTC connection and the IVR system may use the voice content to perform pattern recognition to recognize the utterances made by the user. Thus, the user may interact with the HTML content of the web page via the application server and with the voice content of the web page via the WebRTC connection made with the IVR system.

Once the WebRTC connection is established between the web browser, running on the user device, and the IVR system, the WebRTC connection may need to be maintained when the user navigates to a new web page. When a web browser requests a new web page, any existing WebRTC connections are interrupted when the new page is loaded. Therefore, implementations described herein include providing a mechanism to the web browser to maintain the WebRTC connection when the browser requests a new web page. In some implementations, the mechanism may include a hidden frame that includes the web page. When the user selects a new web page, the web page may be loaded as a new frame in an existing web page. In other implementations, the mechanism may include a fetching script (e.g., a JavaScript script making use of Query library functions). When the user selects a new page, the fetching script may fetch the new page and render the content of the new page without reloading the page.

Furthermore, implementations described herein relate to interrupting a voice browser session and causing the voice browser to request new voice content. When a user is listening to voice content associated with a first web page, via a WebRTC connection to an IVR system, and the user clicks on a link to a second web page, a voice browser running on the IVR system may need to stop processing voice content associated with the first web page and to request new voice content associated with the second web page. However, the voice browser may not have information about the activities of the web browser running on the user device. Therefore, the application server may, upon detecting a request for the second web page, determine that the request is associated with a co-browsing session, and send an interrupt to the voice browser to cause the voice browser to request the new voice content associated with second web page.

If the user makes a selection via voice by speaking a response to the IVR system over the WebRTC connection, the voice browser in the IVR system may request new voice content from the application server. The application server may determine that the voice browser request is associated with a co-browsing session and may identify new HTML content and new voice content based on the request. In some implementations, the application server may first send the new HTML content to the web browser and may then provide the new voice content to the voice browser. In other implementations, the new voice content may be sent first.

A co-browsing framework may enable an application server to integrate call center services into a web page and/or implement voice-controlled input and navigation of web pages, with high reliability and without compromising security. Synchronizing a web browsing experience with a voice browser experience enables a customer to provide voice-enabled a web site that includes voice-enabled web pages. Thus, a visitor to a voice-enabled web site may interact with voice-enabled web pages via a keyboard or a touchscreen as well as via voice through a microphone.

For example, the application server may host a web page with a WebRTC selection object, such as a call button, to enable a user to request to talk to a customer agent. As another example, the application server may host a web page that plays an introductory audio message when the web page is accessed. As another example, the application server may host a web page with a form that includes text input boxes (e.g., a form to provide a user's name and address, etc.) and audio instructions that prompt the user to provide audio input to fill out the form by speaking. Thus, the user may log into an account by speaking authentication information, may input personal information (e.g., a name, a shipping address, credit card information, etc.) without having to type in the information.

As yet another example, the application server may include a web page with hyperlinks and/or other types of selection objects and voice content that enables the user to make selections using the user's voice. As an example, the user may navigate selection objects using spoken commands (e.g., "up," "down," etc.), in response to which the selection objects are highlighted in turn. The user may then select a link or another type of selection object by speaking a different command (e.g., "click," etc.). As another example, the user may speak a more complicated command which may be recognized by the voice browser and used to generate a request (e.g., "click third link," "put in cart," "access last statement," etc.). As yet another example, content on a web page may be provided to the user in an audio format (e.g., professionally recorded audio rather than audio generated by a text-to-speech application).

The co-browsing framework may be particularly useful on mobile devices with limited input capabilities (e.g., no keyboard), when a user is unable to provide tactile input (e.g., while driving), and/or for users with visual impairments.

FIG. 1 is a diagram of an exemplary environment 100 in which the systems and/or methods described herein may be implemented. As shown in FIG. 1, environment 100 may include a user device 110, a public network 120, and a provider network 160.

User device 110 may include any device with a browser application configured with WebRTC functionality. For example, user device 110 may include a portable communication device (e.g. a mobile phone, a smart phone, a tablet computer, a global positioning system (GPS) device, a wearable computer device (e.g., a wristwatch computer, an optical head-mounted display computer, and/or another type of wireless device); a personal laptop or desktop computer or workstation; a server device; a television; a set-top box; a gaming system; and/or any type of device with communication capability.

User device 110 may include an HTML browser 115 (e.g., Mozilla Firefox, Microsoft Explorer, Google Chrome, Apple Safari, etc.). In other implementations, HTML browser 115 may be implemented in an application obtained from application server 130 and installed on user device 110. HTML browser 115 may request HTML content (e.g., web pages) from other computer devices. Furthermore, HTML browser 115 may include WebRTC call functionality. The WebRTC functionality may include a Web Application Programming Interface (API) for interacting with an audio and/or video application. The WebRTC API may use real-time communication protocols (e.g., Session Initiation Protocol (SIP), Extensible Messaging and Presence Protocol (XMPP), Real Time Protocol (RTP), Interactive Connectivity Establishment (ICE), Session Traversal Utilities for Network Address Translation (STUN), etc.) that may manage real-time connections with other devices across a network.

Public network 120 may include one or more circuit-switched networks and/or packet-switched networks. Public network 120 may include a local area network (LAN), a wide area network (WAN), a metropolitan area network (MAN), an ad hoc network, an intranet, the Internet, a fiber optic-based network, a wireless network, and/or any combination of these or other types of networks. Public network 120 may include an application server 130, a WebRTC access server 140, and a WebRTC gateway 150.

Application server 130 may include one or more computer devices, such as server devices, which host a web site associated with the customer and which includes co-browsing enabled web pages. A co-browsing enabled web page may include HTML content (e.g., a web page) and voice content (e.g., voice dialog content along with voice recognition patterns). When a co-browsing enabled web page is accessed by HTML browser 115, application server 130 may provide HTML content associated with the web page to HTML browser 115, along with instructions to establish a WebRTC connection for the voice content. Furthermore, application server 130 may request a validation Uniform Resource Identifier (URI) from WebRTC access server 140. The validation URI may be used to validate a WebRTC connection. The instructions to establish the WebRTC connection, sent to HTML browser 115, may include the validation URI. Furthermore, application server 130 may provide a mechanism to HTML browser 115 by which HTML browser 115 may maintain a WebRTC connection when requesting a new web page. The mechanism may include a hidden frame or a fetching script that enables HTML browser 115 to request and render new HTML content without reloading a web page.

WebRTC access server 140 may include one or more computer devices, such as server devices, which enable application server 130 to communicate with a WebRTC backend system. For example, WebRTC access server 140 may receive an instruction to perform a control action for a particular WebRTC call, authenticate application server 130, and forward the instruction to perform the control action to a WebRTC backend system. Furthermore, WebRTC access server 140 may receive a response to the instruction to perform the control action, receive a report message, from the WebRTC backend system, and/or forward the response and/or the report message to application server 130.

WebRTC gateway 150 may include one or more network devices that function as a gateway for provider network 160 with respect to WebRTC calls. For example, WebRTC gateway 150 may route WebRTC calls from public network 120 to provider network 160 and may route calls from provider network 160 to public network 120. In addition, WebRTC gateway 150 may convert an incoming WebRTC call to a Session Initiation Protocol (SIP) call, or to another type of call that is used within provider network 160. Furthermore, WebRTC gateway 150 may convert an outgoing SIP call, or another type of call used within provider network 160, to a WebRTC call in public network 120. WebRTC gateway 150 may apply one or more filter rules to determine whether a particular WebRTC connection should be allowed to be made into provider network 160.

Provider network 160 may include a circuit-switched network and/or packet-switched network. Provider network 160 may include a local area network (LAN), a wide area network (WAN), a metropolitan area network (MAN), an ad hoc network, an intranet, a fiber optic-based network, a wireless network, and/or any combination of these or other types of networks. Provider network 160 may include a validation proxy 170, a WebRTC backend system 180, and an IVR system 190.

Validation proxy 170 may validate WebRTC URIs received from WebRTC gateway 150. For example, WebRTC gateway 150 may forward a WebRTC URI to validation proxy 170. Validation proxy 170 may send the WebRTC URI to WebRTC backend system 180 and may receive a validation message back from WebRTC backend system 180. The validation message may include call session data. Validation proxy 170 may add the call session data to the WebRTC call.

WebRTC backend system 180 may generate WebRTC URIs for WebRTC calls associated with provider network 160 and may validate generated WebRTC URIs. WebRTC backend system 180 may interface with application servers 130 via WebRTC access server 140. WebRTC backend system 180 may receive a request for a validation URI from application server 130 via WebRTC access server 140, generate the validation URI, and forward the generated validation URI to application server 130 via WebRTC access server 140. The generated validation URI may be sent by HTML browser 115 to WebRTC gateway 150 when requesting a WebRTC connection to IVR system 190. WebRTC backend system 180 may validate the generated validation URI at a later time based on a request received from validation proxy 170. Moreover, WebRTC backend system 180 may be configured to enable communication between IVR system 190 and application server 130 via WebRTC access server 140. As an example, WebRTC backend system 180 may receive an instruction to perform a control action, such as a voice browser interrupt, from application server 130 and may forward the instruction to perform the control action to IVR system 190.

IVR system 190 may perform call center services for one or more customers of provider network 160. In some implementations, IVR system 190 may run multiple instance of an IVR platform, with each instance being associated with a particular customer. Each IVR platform that may request information from a caller and may direct the caller to a particular destination. Different customers may be associated with different types, versions, subscriptions, and/or options configured for instances of IVR system 190.

IVR system 190 may prompt the user to make a selection relating to the user's reason for calling or prompt the user to provide identifying information. Alternatively, some or all of the information may be obtained by application server 130 and passed to IVR system 190 as call session data included in a WebRTC call. IVR system 190 may perform an action after obtaining the information. For example, IVR system 190 may park the call while a contact center agent is selected or made available, direct the user to a voicemail system where the user can leave a message, and/or connect the user to a contact center agent.

IVR system 190 may receive telephone calls from callers using a WebRTC device (e.g., user device 110 with WebRTC-enabled HTML browser 115), an Internet Protocol (IP) telephone device, and/or callers using a time division multiplexing (TDM) telephone device (not shown in FIG. 1). For example, IVR system 190 may receive a request to establish a WebRTC connection with HTML browser 115 and may establish the WebRTC connection with HTML browser 115 in response to the request. In some implementations, the WebRTC connection may be implemented as a WebRTC connection from user device 110 to WebRTC gateway 150 and as a SIP connection from WebRTC gateway 150 to IVR system 190. IVR system 190 may communicate with contact center agents, such as a WebRTC contact center agent, an IP contact center agent, and/or or a TDM contact center agent (not shown in FIG. 1).

IVR system 190 may include voice browser 195. Voice browser 195 may include a browser configured to request voice content from application server 130 (e.g., via WebRTC access server 140 and/or WebRTC backend system 180) and to receive the requested voice content. In some implementations, voice browser 195 may include a VXML browser. In other implementations, voice browser 195 may include a different type of voice browser. Voice browser 195 may receive voice content from application server 130 and may send audio information based on the received voice content over an established WebRTC connection to HTML browser 115. The user may speak a response over the WebRTC connection and IVR system 190 may perform pattern recognition on the response using the voice content (received from application server 130) to match the response to an available selection. Voice browser 195 may provide the selection, based on the matched response, to application server 130 as a request for new voice content.

Furthermore, voice browser 195 may be configured to receive an interrupt from application server 130. The interrupt may cause the voice browser 195 to cease playing audio based on currently loaded voice content and may instruct the voice browser 195 to request new voice content. For example, the interrupt may identify a URI of a new VXML page that voice browser 195 should request.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
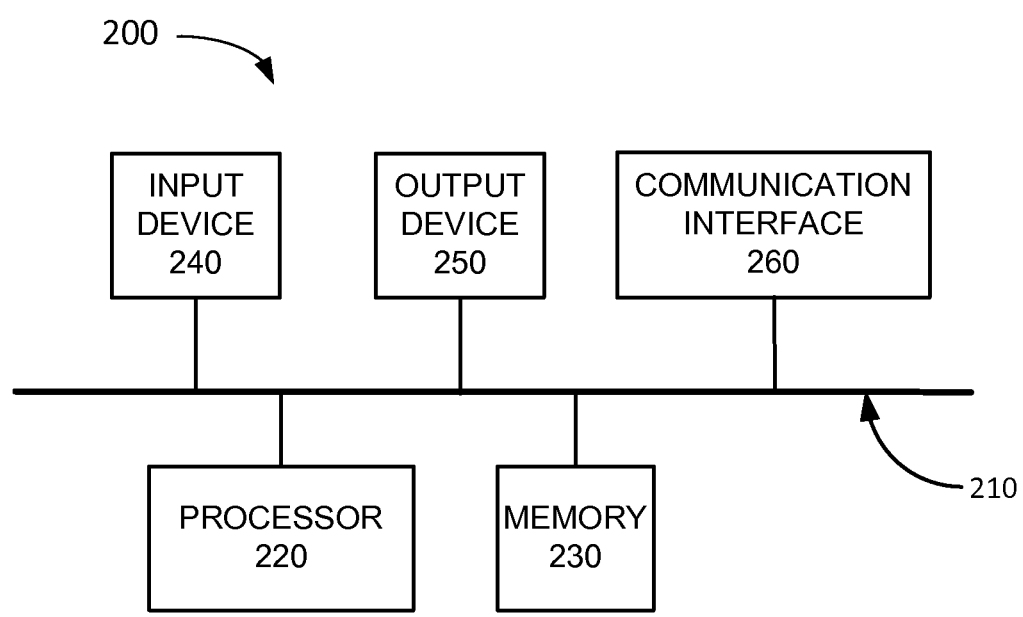
FIG. 2 is a diagram illustrating exemplary components of a device that may be included in one or more components of FIG. 1.

FIG. 2 is a diagram illustrating exemplary functional components of device 200. User device 110, application server 130, WebRTC access server 140, WebRTC gateway 150, validation proxy 170, WebRTC backend system 180, and/or IVR system 190 may each include and/or implemented over one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to visual and voice co-browsing. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
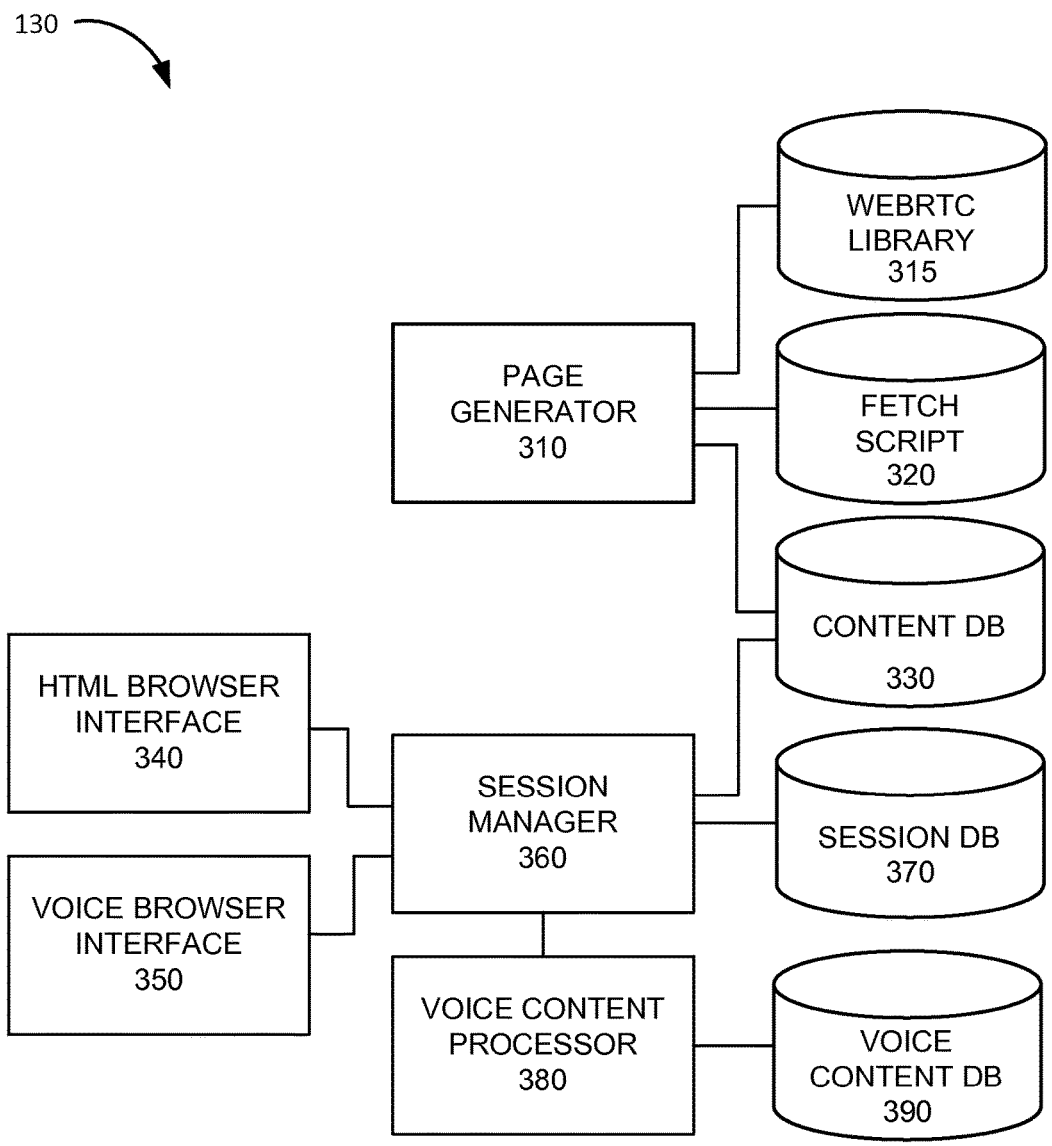
FIG. 3 is a diagram illustrating exemplary functional components of the application server of FIG. 1.

FIG. 3 is a diagram illustrating exemplary functional components of application server 130. In some implementations, the functional components of application server 130 may be implemented, for example, via processor 220 executing instructions from memory 230. Alternatively, some or all of the functional components of application server 130 may be implemented via hard-wired circuitry. As shown in FIG. 3, application server 130 may include a page generator 310, a WebRTC library 315, a fetch script 320, a content database (DB) 330, an HTML browser interface 340, a voice browser interface 350, a session manager 360, a session DB 370, a voice content processor 380, and a voice content DB 390.

Page generator 310 may be used to generate web pages, or other types of content, that includes both HTML content and voice content and that are enabled for co-browsing. As an example, page generator 310 may include a web page development system that includes web development tools such as an HTML and/or Document Object Model (DOM) viewer and editor. As another example, page generator 310 may be used to link existing web pages (e.g., HTML pages) with existing voice content (e.g., VXML pages). Page generator 310 may further add, or associate, content from WebRTC library 315 and/or fetching script 320 to a generated co-browsing-enabled web page. Page generator 310 may store the generated web pages, and/or information relating to the generated web pages, in content DB 330.

WebRTC library 315 may include a library of WebRTC functions that enable user device 110 to establish a WebRTC connection with IVR system 190 (and/or with other WebRTC-enabled devices). WebRTC library 315 may include, for example, one or more functions to initialize a library of WebRTC functions, one or more functions to create and manage WebRTC sessions, one or more functions to validate a WebRTC connection request, one or more functions to perform WebRTC event callbacks (e.g., response to asynchronous events such as a failed request, an incoming WebRTC call, etc.), and/or other types of WebRTC functions.

Fetch script 320 may include a script (e.g., JavaScript) that enables a web page to request, receive, and render new HTML content without reloading a web page. Fetching script 320 may thus enable HTML browser 115 to maintain an established WebRTC connection when a new web page is requested and rendered in HTML browser 115. In some implementations, fetch script 320 may enable HTML browser 115 to request a new web page using an asynchronous Javascript and XML interface (AJAX). In other implementations, fetching script 320 may be used to generate a hidden frame which includes requested web pages, resulting in the hidden frame being refreshed without the underlying web page being reloaded.

Content DB 330 may store information relating to co-browsing content. As an example, content DB 330 may include a web page that includes both HTML content and voice content. As another example, content DB 330 may associate HTML pages with voice content pages (e.g., VXML pages).

HTML browser interface 340 may communicate with HTML browser 115 over one or more APIs. For example, HTML browser interface 340 may receive a Hypertext Transfer Protocol (HTTP) GET request from HTML browser and may forward the request to session manager

360 for processing. As another example, HTML browser interface 340 may receive instructions from session manager 360 to provide HTML content to HTML browser 115 and may, in response, provide the HTML content to HTML browser 115.

Voice browser interface 350 may communicate with voice browser 195 via one or more APIs. For example, voice browser interface 350 may receive a GET request from voice browser 195 for VXML content and may forward the request to session manager 360 for processing. As another example, voice browser interface 350 may receive instructions from session manager 360 to provide VXML content to voice browser 195 and may, in response, provide the VXML content to voice browser 195.

As yet another example, voice browser interface 350 may receive an indication from IVR system 190 that a particular WebRTC connection has been established with user device 110 using a first API. As yet another example, in response to receiving the indication from IVR system 190 about the established WebRTC connection, voice browser interface 350 may send an instruction, using a second API, to voice browser 195 identifying particular voice content that voice browser 195 should request to begin a voice browser session. As yet another example, voice browser interface 350 may send an interrupt message to voice browser 195, using a third API, to instruct voice browser 195 to stop playback of voice content and may instruct voice browser 195 to request new voice content identified in the interrupt message.

Session manager 360 may manage co-browsing sessions associated with application server 130. For example, session manager 360 may generate a co-browsing session ID when a co-browsing-enabled web page is requested and may correlate an HTML session and a voice session associated with the co-browsing session ID. Furthermore, session manager 360 may generate a voice browser interrupt when HTML browser 115 requests new HTML content that is associated with new voice content.

Session DB 370 may store information relating a co-browsing sessions associated with application server 130. Exemplary information that may be stored in session DB 370 is described below with reference to FIG. 5. Voice content processor 380 may process requests received from voice browser 195. Voice content DB 390 may store voice content (e.g., VXML pages). As an example, a VXML page may include information and/or prompts that are played to a user when the user accesses a particular web page. As another example, a VXML page may include disambiguation voice grammars that are used to identify a user selection (e.g., to associate a user utterance with a particular name in a database of user names).

Although FIG. 3 shows exemplary functional components of application server 130, in other implementations, application server 130 may include fewer functional components, different functional components, differently arranged functional components, or additional functional components than those depicted in FIG. 3. Additionally or alternatively, one or more functional components of application server 130 may perform functions described as being performed by one or more other functional components of application server 130.

Figure 4:
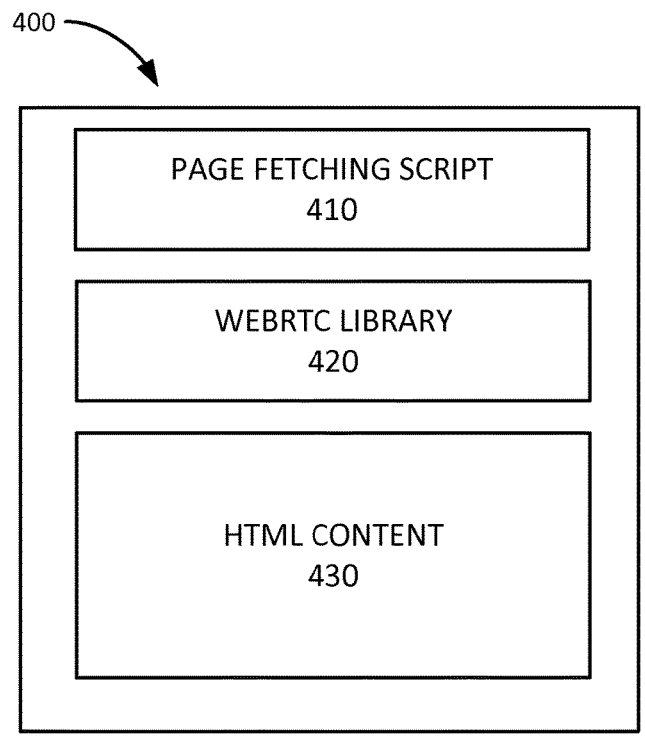
FIG. 4 is a diagram illustrating exemplary components of a web page sent by the application server of FIG. 1 to the user device of FIG. 1.

FIG. 4 is a diagram illustrating exemplary components of a web page 400 sent by the application server 130 to user device 110. As shown in FIG. 4, web page 400 may include a page fetching script 410, a WebRTC library 420, and HTML content 430.

Fetching script 410 may include a script generated based on information stored in fetch script 320. Fetching script 410 may be used by HTML browser 115 to maintain an established WebRTC connection when a new web page is requested and rendered. For example, fetching script 410 may detect whether a WebRTC connection has been established. If a WebRTC connection has been established, fetching script 410 may detect and/or intercept requests made by the user (e.g., a click on a link, etc.) and/or GET requests automatically generated by HTML browser 115 and may send the request to application server 130 on behalf of HTML browser 115. For example, fetching script 410 may request, receive, and render the content associated with the detected GET request using an AJAX interface established with application server 130.

WebRTC library 420 may include WebRTC library functions based on information stored in WebRTC library 315. In other implementations, WebRTC library 420 may be provided to HTML browser 115 as an add-on application (e.g., toolbar, plug-in, etc.) obtained from application server 130 and may not be included in a particular web page. HTML content 430 may correspond to the HTML content of web page 400.

Although FIG. 4 shows exemplary components of web page 400, in other implementations, web page 400 may include fewer components, different components, differently arranged components, or additional components than those depicted in FIG. 4.

Figure 5:
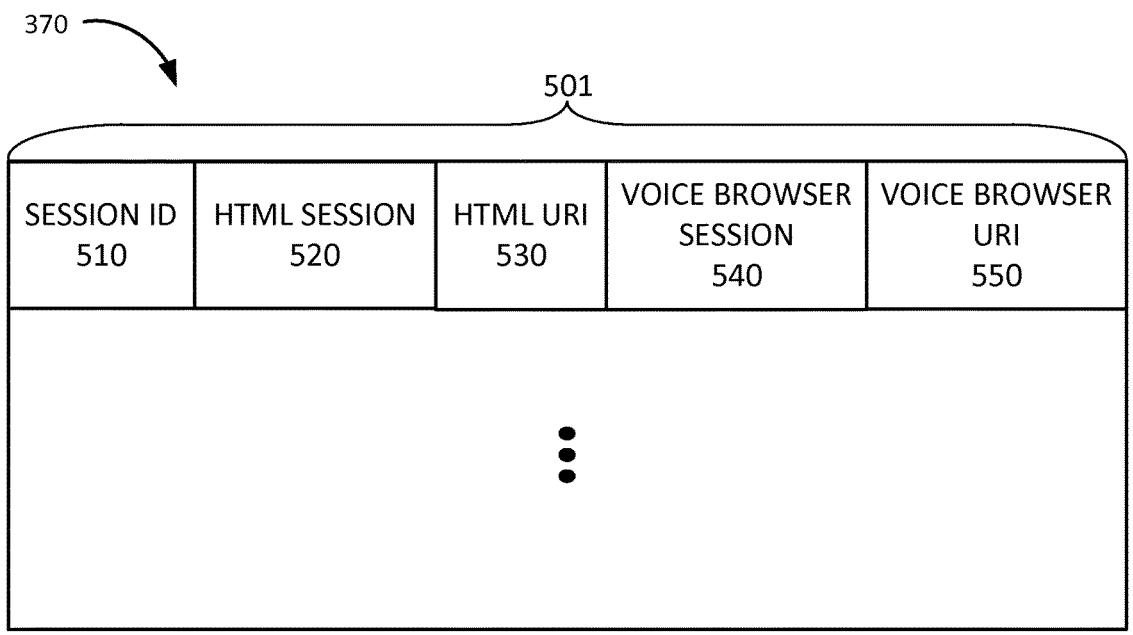
FIG. 5 is a diagram illustrating exemplary components that may be stored in the session database of FIG. 3.

FIG. 5 is a diagram illustrating exemplary information that may be stored in session DB 370. As shown in FIG. 5, session DB 370 may store one or more session records 501. Session record 501 may store information relating to a particular co-browsing session. Session record 501 may include a session identifier (ID) field 510, an HTML session field 520, an HTML URI field 530, a voice browser session field 540, and a voice browser URI field 550.

Session ID field 510 may include a co-browsing identifier associated with the particular co-browsing session. HTML session field 520 may include information identifying an HTML session associated with HTML browser 115 and associated with the particular co-browsing session. HTML URI field 530 may include information identifying a URI most recently requested by HTML browser 115. Voice browser session field 540 may include information identifying a voice browser session associated with voice browser 195 and associated with the particular co-browsing session. Voice browser URI field 550 may identify a URI most recently requested by voice browser 195.

Although FIG. 5 shows exemplary fields of session DB 370, in other implementations, session DB 370 may include fewer fields, different fields, differently arranged fields, or additional fields than those depicted in FIG. 5.

Figure 6:
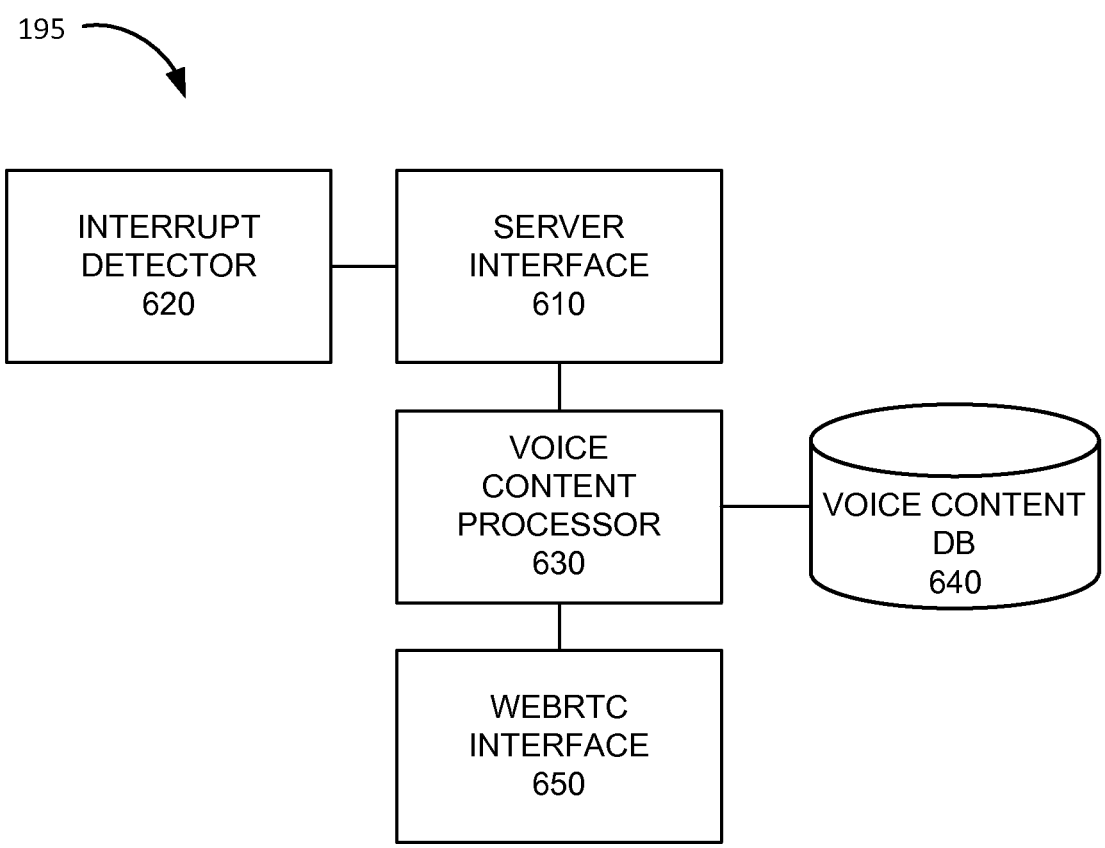
FIG. 6 is a diagram illustrating exemplary functional components of the interactive voice response system of FIG. 1.

FIG. 6 is a diagram illustrating exemplary functional components of voice browser 195 according to an implementation described herein. In some implementations, the functional components of voice browser 195 may be implemented, for example, via processor 220 executing instructions from memory 230. Alternatively, some or all of the functional components of voice browser 195 may be implemented via hard-wired circuitry. As shown in FIG. 6, Voice browser 195 may include a server interface 610, an interrupt detector 620, a voice content processor 630, a voice content DB 640, and a WebRTC interface 650.

Server interface 610 may communicate with application server 130 via one or more APIs. As an example, server interface 610 may inform application server 130 that a WebRTC connection with user device 110 has been established using a first API. As another example, server interface 610 may receive instructions from application server 130 identifying particular voice content that voice browser 195 should request using a second API. As yet another example, server interface 610 may request voice content from application server 130. As yet another example, server interface 610 may receive an interrupt message from application server 130, instructing voice browser 195 to stop playing voice content and to request new voice content.

Interrupt detector 620 may detect interrupt messages received via server interface 610. When interrupt detector 620 detects a voice browser interrupt message, interrupt detector 620 instructs voice content processor 630 to stop playing voice content from voice content DB 640 and/or to stop processing a user utterance. Interrupt detector 620 may identify, based on the received interrupt message, new voice content that voice browser 195 should request.

Voice content processor 630 may receive voice content via server interface 610, may store the voice content in voice content DB 640, and/or process the voice content based on instructions associated with the voice content. Voice content DB 640 may store the voice content received from application server 130 via server interface 610. As an example, voice content processor 630 may play an audio (or video) file based on a received VXML page. As another example, voice content processor 630 may prompt the user to make a selection (e.g., speak a particular command from a set of commands) and/or provide particular information (e.g., the user's account number, name, address, etc.), and/or may receive a hotword from the user that may cause voice browser 195 to instruct IVR system 190 to initiate a connection to a customer service agent. As yet another example, voice content processor 630 may use information stored in voice content DB 640 to disambiguate a user utterance to determine a user selection and/or to determine information provided by the user.

WebRTC interface 650 may establish a WebRTC connection with user device 110 and may communicate with user device 110 over the WebRTC connection. As an example, WebRTC interface 650 may send audio and/or video content played by voice content processor 630 to user device 110. As another example, WebRTC interface 650 may receive audio and/or video carrying user utterances from user device 110.

Although FIG. 6 shows exemplary functional components of voice browser 195, in other implementations, voice browser 195 may include fewer functional components, different functional components, differently arranged functional components, or additional functional components than those depicted in FIG. 6. Additionally or alternatively, one or more functional components of voice browser 195 may perform functions described as being performed by one or more other functional components of voice browser 195.

Figure 7:
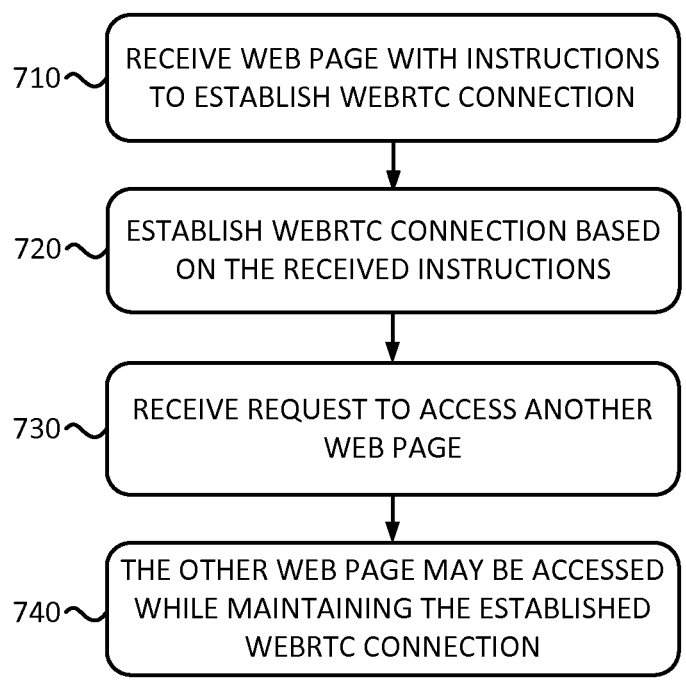
FIG. 7 is a flowchart of an exemplary process for maintaining a Web Real-Time Communication connection over changing web pages according to an implementation described herein.

FIG. 7 is a flowchart of an exemplary process for maintaining a Web Real-Time Communication connection over changing web pages according to an implementation described herein. In some implementations, the process of FIG. 7 may be performed by user device 110. In other implementations, some or all of the process of FIG. 7 may be performed by another device or a group of devices separate from and/or including user device 110. Furthermore, in other implementations, the process of FIG. 7 may include fewer blocks, additional blocks, different blocks, or differently arranged blocks.

The process of FIG. 7 may include receiving a web page with instructions to establish a WebRTC connection (block 710). For example, the user of user device 110 may employ HTML browser 115 to access a web page hosted by application server 130 (e.g., the user may visit the web site of the entity associated with application server 130) and the application server 130 may send the web page to user device 110. The accessed web page may be enabled for visual and voice co-browsing and may include instructions to establish a WebRTC connection with IVR system 190. In some implementations, the web page may include a WebRTC library. In other implementations, HTML browser 115 may include a WebRTC library as an add-on application (e.g., a browser toolbar, a browser plug-in, etc.). Furthermore, the received web page may include a mechanism for maintaining a WebRTC connection when another web page is accessed.

A WebRTC connection may be established based on the received instructions (block 720). For example, HMTL browser 115 may establish a WebRTC connection with IVR system 190 via WebRTC gateway 150. Establishing a WebRTC connection may require validating a WebRTC connection request. User device 110 may receive a validation URI in connection with the instructions to establish a WebRTC connection. The validation URI may be obtained by application server 130 from WebRTC backend system 180 via WebRTC access server 140. When the request is received by WebRTC gateway 150, the validation URI may be validated with WebRTC backend system 180 via validation proxy 170. If the validation URI is validated, WebRTC gateway 150 may send a connection request to IVR system 190 and IVR system 190 may accept the connection request. WebRTC gateway 150 may forward the response accepting the connection request to HTML browser 115.

A request to access another web page may be established (block 730) and the other web page may be accessed while maintaining the WebRTC connection (block 740). For example, the user may request access to another web page by clicking a link or another type of selection object included in the received web page. In response to determining that a WebRTC connection is active, the mechanism for maintaining the WebRTC connection may be activated and the other web page may be obtained and rendered without reloading the currently loaded web page. In some implementations, the mechanism may include page fetching script 410 which may request the new web page from application server 130 without causing a page reload. Page fetching script 410 may, for example, request the URI associated with the requested web page from application server 130 via an AJAX interface. In other implementations, the mechanism may include a hidden frame which includes another frame in which the web page is rendered. When the other web page is requested, the new web page is rendered with the other frame and the hidden frame is not reloaded. Since there is no reload event in HTML browser 115, the established WebRTC connection is maintained.

Figure 8:
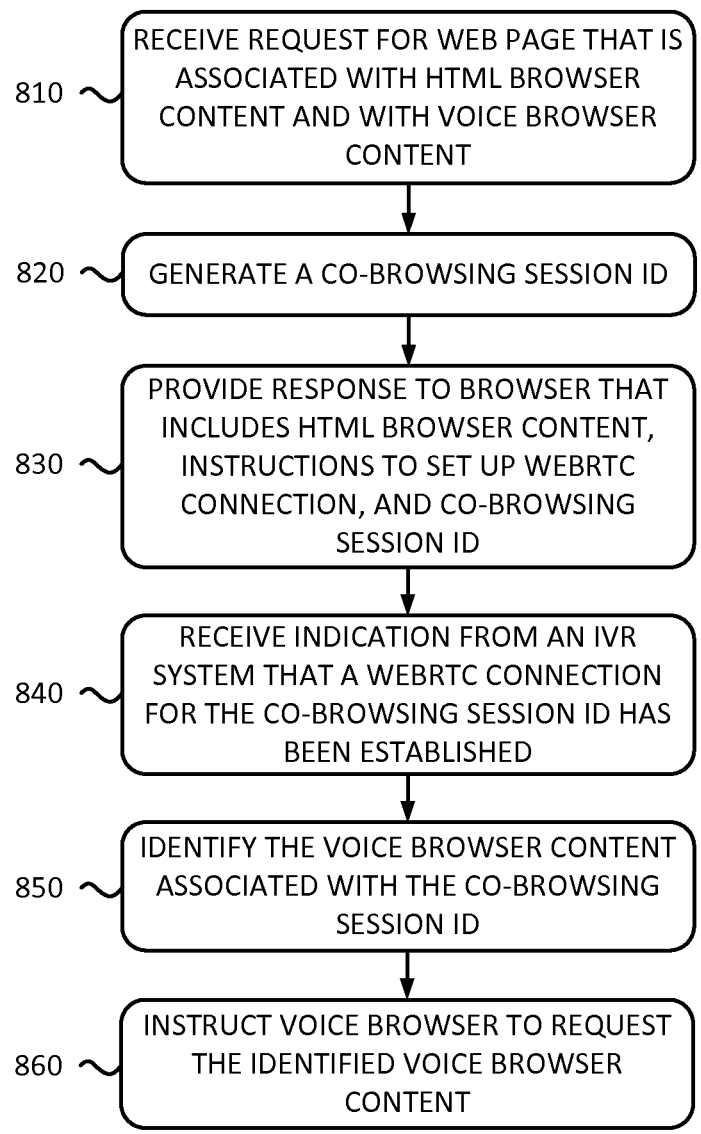
FIG. 8 is a flowchart of an exemplary process for establishing a co-browsing session according to an implementation described herein.

FIG. 8 is a flowchart of an exemplary process for establishing a co-browsing session according to an implementation described herein. In some implementations, the process of FIG. 8 may be performed by application server 130. In other implementations, some or all of the process of FIG. 8 may be performed by another device or a group of devices separate from and/or including application server 130. Furthermore, in other implementations, the process of FIG. 8 may include fewer blocks, additional blocks, different blocks, or differently arranged blocks.

The process of FIG. 8 may include receiving a request for a web page that is associated with HTML content and with voice content (block 810). For example, application server 130 may receive a GET request from HTML browser 115 for a web page that includes HTML content and voice browser content and that is indicated as a co-browsing-enabled web page in content DB 330.

A co-browsing session ID may be generated (block 820). In response to receiving the GET request from HTML browser 115 and determining that the web page is enabled for co-browsing, session manager 360 may generate a co-browsing session ID and store the generated co-browsing session ID in session DB 370. Furthermore, session manager 360 may associate the HTML session ID associated with the GET request with the co-browsing session ID and may record the URI of the requested web page.

A response may be provided to an HTML browser that includes the HTML content, the generated co-browsing session ID, and instructions to set up a WebRTC connection (block 830). For example, HTML browser interface 340 may provide a response to HTML browser 115 that includes the requested web page. The requested web page may include the HTML content associated with the web page, a WebRTC library and/or instructions to set up a WebRTC connection with IVR system 190, and the generated co-browsing session ID. Furthermore, the web page may include a mechanism for maintaining a WebRTC connection if a new page is requested, such as page fetching script 410, a hidden frame, and/or another type of mechanism.

An indication may be received from an IVR system that a WebRTC connection for the co-browsing session ID has been established (block 840). For example, once the WebRTC connection is established between HTML browser 115 and IVR system 190, IVR system 190 may send an indication to application server 130, using an API associated with voice browser interface 350, informing application server 130 that the WebRTC session associated with the generated co-browsing session ID is established.

Voice browser content associated with the co-browsing session ID may be identified (block 850) and the voice browser may be instructed to request the identified voice browser content (block 860). For example, in response to receiving the indication of the established WebRTC connection, session manager 360 may access session DB 370 to determine the HTML content associated with the co-browsing session ID and may then access content DB 330 to identify the voice content associated with the HTML content (e.g., a VXML URI associated with the HTML URI accessed by HTML browser 115). Voice browser interface 350 may then instruct, using an API associated with server interface 610, voice browser 195 to request the identified voice content. In response, voice browser 195 may, for example, send a GET request to request the VXML URI associated with the HTML URI. Application server 130 may provide the requested voice content to voice browser 195 and voice browser 195 may start to process the received voice content (e.g., by playing audio and/or video content included in the voice content).

Figure 9:
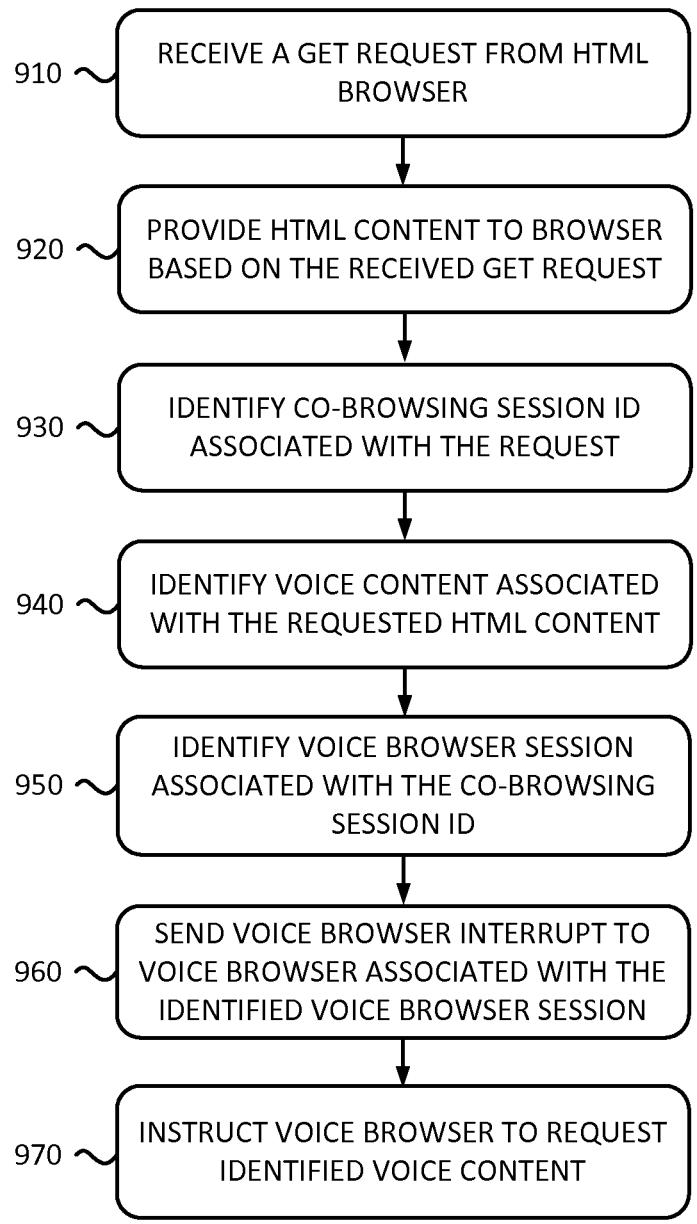
FIG. 9 is a flowchart of an exemplary process for processing an HTML browser click during a co-browsing session according to an implementation described herein.

FIG. 9 is a flowchart of an exemplary process for processing an HTML browser click during a co-browsing session according to an implementation described herein. In some implementations, the process of FIG. 9 may be performed by application server 130. In other implementations, some or all of the process of FIG. 9 may be performed by another device or a group of devices separate from and/or including application server 130. Furthermore, in other implementations, the process of FIG. 9 may include fewer blocks, additional blocks, different blocks, or differently arranged blocks.

The process of FIG. 9 may include receiving a request from an HTML browser (block 910) and providing the requested HTML content to the HTML browser (block 920). For example, HTML browser 115 may send a GET request to application server 130 in response to the user clicking on a link or another type of selection object in a web page being displayed by HTML browser 115. In response, application server 130 may provide the requested HTML content to user device 110.

A co-browsing session ID associated with the request may be identified (block 930), voice browser content associated with the requested HTML content may be identified (block 940), and a voice browser session associated with the co-browsing session ID may be identified (block 950). For example, session manager 360 may determine, by accessing session DB 370 based on an HTML session identifier associated with the request, that the get request for HTML content is associated with an active co-browsing session ID. Furthermore, session manager 360 may determine that the requested web page is associated with voice content. Moreover, session manager 360 may determine, by accessing session DB 370, that the voice content is different from voice content last requested by voice browser 195 associated with the voice browser session that is associated with the co-browsing session ID.

A voice browser interrupt may be sent to the voice browser associated with the identified voice browser session (block 960) and the voice browser may be instructed to request the identified voice content (block 970). For example, voice browser interface 350 may send an interrupt message to voice browser 195, associated with the co-browsing session ID, using an API associated with server interface 610. The interrupt message may instruct voice browser 195 to stop playing the previously requested voice content and to request the identified voice content (e.g., the VXML URI associated with the URI of the HTML content sent to user device 110).

Figure 10:
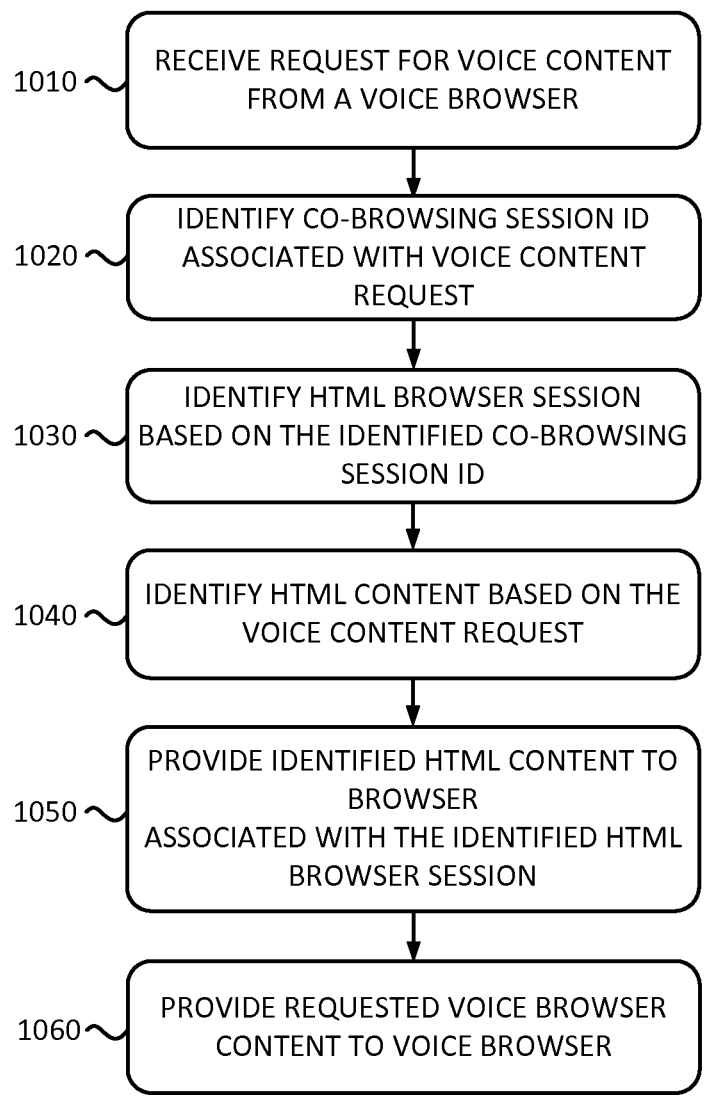
FIG. 10 is a flowchart of an exemplary process for processing a voice browser selection during a co-browsing session according to an implementation described herein.

FIG. 10 is a flowchart of an exemplary process for processing a voice browser selection during a co-browsing session according to an implementation described herein. In some implementations, the process of FIG. 10 may be performed by application server 130. In other implementations, some or all of the process of FIG. 10 may be performed by another device or a group of devices separate from and/or including application server 130. Furthermore, in other implementations, the process of FIG. 10 may include fewer blocks, additional blocks, different blocks, or differently arranged blocks.

The process of FIG. 10 may include receiving a request for voice content from a voice browser (block 1010). For example, the user may speak a command that voice browser 195 interprets as a selection of from a set of possible selections associated with voice content stored in voice content DB 640. As an example, the user may speak a word or phrase corresponding to an option played to the user (e.g., speaking "one" in response to "choose one to access your account"). As another example, the user may speak a word or phrase corresponding to a selection object displayed on a web page (e.g., "place order," "click third link," etc.). As yet another example, the user may speak a hotword to request a customer service representative. The voice content may then be used to associate the user selection with new voice content that should be requested. For example, each possible user selection may be associated with a particular VXML URI and voice browser 195 may send a GET request to application server 130 for the particular VXML URI associated with a selection identified based on the received user utterance.

A co-browsing session ID associated with the voice content request may be identified (block 1020), an HTML browser session may be identified based on the identified co-browsing session ID (block 1030), and HTML content associated with the requested voice content may be identified (block 1040). For example, session manager 360 may determine, by accessing session DB 370 based on an voice browser session identifier associated with the request, that the GET request for the VXML content is associated with an active co-browsing session ID. Furthermore, session manager 360 may determine that the requested VXML page is associated with HTML content. Moreover, session manager 360 may determine, by accessing session DB 370, that the HTML content is different from HTML content last requested by HTML browser 115 associated with the HTML browser session that is associated with the co-browsing session ID.

The identified HTML content may be provided to an HTML browser associated with identified HTML browser session (block 1050). For example, application server 130 may provide the identified HTML content to user device 110 prior to providing the requested voice content to voice browser 195. The requested voice browser content may be provided to the voice browser (block 1060). For example, application server 130 may provide the requested voice content to voice browser 195. In response, voice browser 195 may start to process the received voice content (e.g., by playing audio and/or video content included in the voice content).

Figure 11:
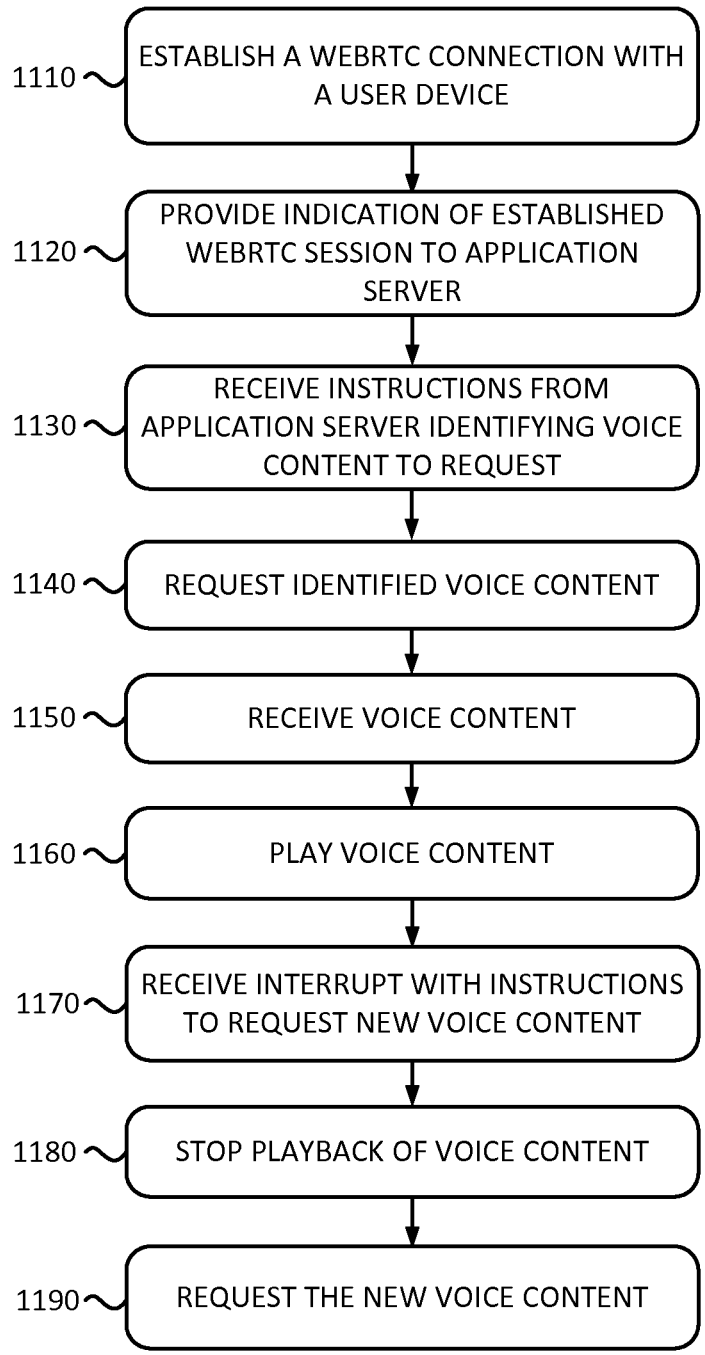
FIG. 11 is a flowchart of an exemplary process for interrupting a voice browser according to an implementation described herein.

FIG. 11 is a flowchart of an exemplary process for interrupting a voice browser according to an implementation described herein. In some implementations, the process of FIG. 11 may be performed by IVR system 190. In other implementations, some or all of the process of FIG. 11 may be performed by another device or a group of devices separate from and/or including IVR system 190. Furthermore, in other implementations, the process of FIG. 11 may include fewer blocks, additional blocks, different blocks, or differently arranged blocks.

The process of FIG. 11 may include establishing a WebRTC connection with a user device (block 1110). For example, IVR system 190 may establish a WebRTC connection with user device 110 using WebRTC interface 650. In some implementations, a WebRTC connection may be established from IVR system 190 to HTML browser 115 via WebRTC gateway 150. In other implementations, a WebRTC connection may be established from HTML browser 115 to WebRTC gateway 150 and a SIP connection may be established from WebRTC gateway 150 to IVR system 190.

An indication of the established WebRTC connection may be provided to an application server (block 1120) and instructions may be received from the application server identifying voice content to request (block 1130). For example, once the WebRTC connection is established between HTML browser 115 and IVR system 190, IVR system 190 may send an indication to application server 130, using an API associated with voice browser interface 350, informing application server 130 that the WebRTC session associated with the generated co-browsing session ID is established. Server interface 610 may then receive an instruction from application server 130 to start a voice browser session by requesting particular voice content (e.g., a particular VXML URI).

The identified voice content may be requested (block 1140), received (block 1150), and played (block 1160). For example, voice browser 195 may send a GET request to request the identified voice content using the specified VXML URI. Application server 130 may provide the requested voice content to voice browser 195. In response, voice browser 195 may start to process the received voice content (e.g., by playing audio and/or video content included in the voice content).

An interrupt may be received with instructions to request new voice content (block 1170), playback of the voice content may be stopped (block 1180), and the new voice content may be requested (block 1190). For example, server interface 610 may receive an interrupt message over an API and interrupt detector 620 may cause voice content processor 630 to stop processing the obtained voice content by stopping playback of audio and/or video files and/or by stopping processing of user utterances. The received interrupt message may include an instruction to request new voice content associated with a new VXML URI. In response, server interface 610 may send a GET request using the new VXML URI to obtain the new voice content.

Figure 12:
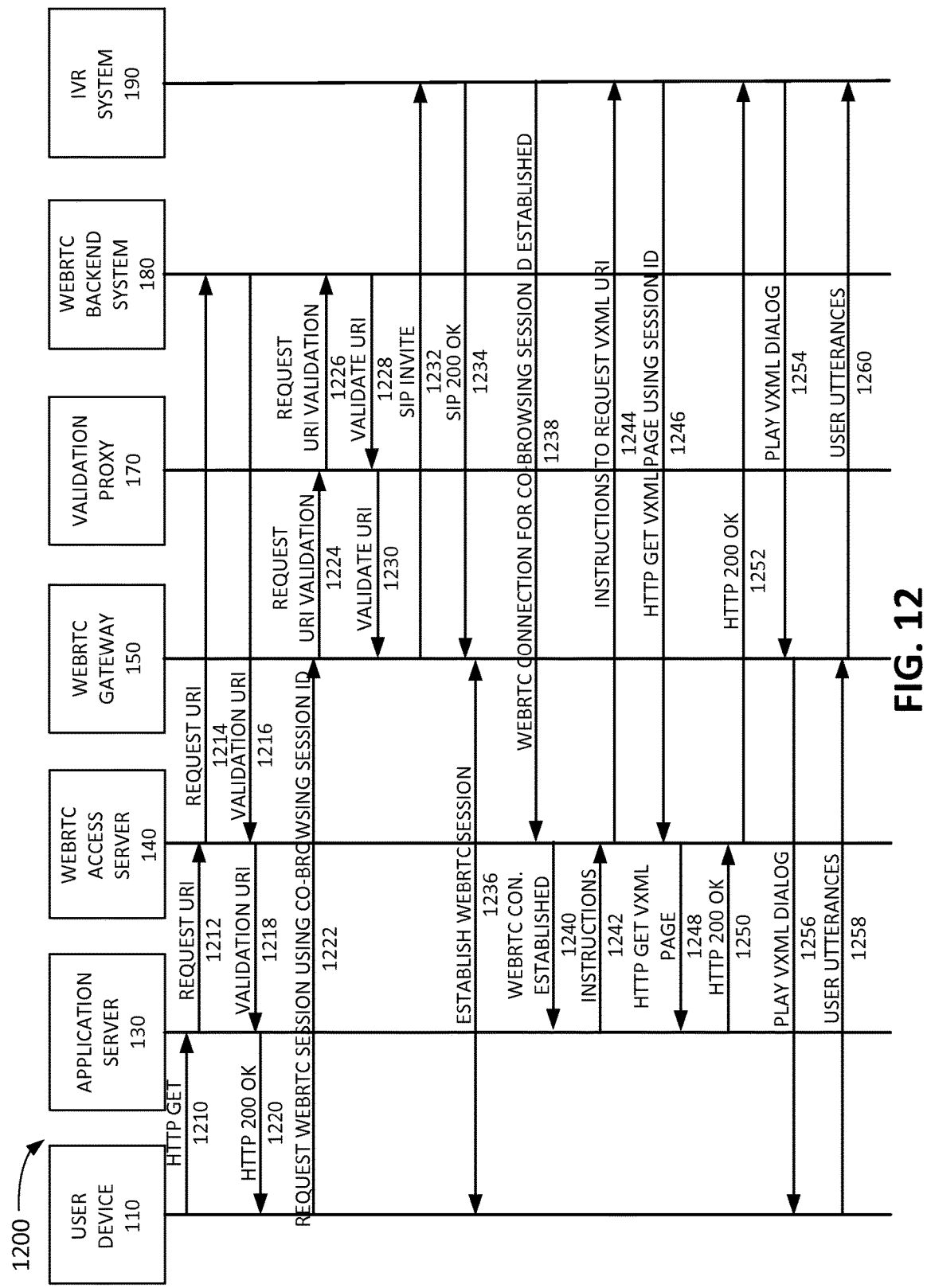
FIG. 12 is a diagram of a signal flow for establishing a co-browsing session according to an implementation described herein.

FIG. 12 is a diagram of a signal flow 1200 for establishing a co-browsing session according to an implementation described herein. Signal flow 1200 may include user device 110 sending an HTTP GET request to application server 130 to request a web page associated with an HTML URI specified in the GET request (signal 1210). Application server 130 may determine that the requested web page is enabled for co-browsing and requires a WebRTC connection. In response, application server 130 may request a validation URI from WebRTC backend system 180 via WebRTC access server 140 (signals 1212 and 1214) and WebRTC backend system 180 may generate the validation URI and provide the validation URI to application server 130 via WebRTC access server 140 (signals 1216 and 1218). Application server 130 may further generate a co-browsing session ID based on the received GET request. Application server 130 may send an HTTP 200 OK response to user device 110 with the requested web page, which may include an instruction to set up a WebRTC connection with IVR system 190 using the validation URI (signal 1220). The web page may further include the generated co-browsing session ID, page fetching script 410, and WebRTC library 420.

User device 110 may then send a request for a WebRTC session to WebRTC gateway 150 (signal 1222). The request may include the validation URI and the generated co-browsing session ID. WebRTC gateway 150 may request validation of the validation URI from WebRTC backend system 180 via validation proxy 170 (signals 1224 and 1226). If WebRTC backend system 180 determines that the validation URI is valid (e.g., corresponds to the URI associated with the co-browsing session ID and is not expired), WebRTC backend system 180 may validate the URI via validation proxy 170 (signals 1228 and 1230).

Once the WebRTC request is validated, WebRTC gateway 150 may send a SIP INVITE message to IVR system 190 and IVR system 190 may respond with a SIP 200 OK message if the SIP connection request is accepted (signals 1232 and 1234). WebRTC gateway 150 may then send a response to user device 110 to accept the request to establish the WebRTC connection (signal 1236). User device 110 may confirm the WebRTC connection with IVR system 190 with a confirmation message (not shown in FIG. 12).

Once IVR system 190 determines that the WebRTC connection is established with user device 110, IVR system 190 may send an indication to application server 130, via WebRTC access server 140, which informs application server 130 that the WebRTC connection for the co-browsing session ID has been established (signals 1238 and 1240). In response, application server 130 may determine a VXML URI associated with the web page that was requested by user device 110 via signal 1210 and may instruct IVR system 190, via WebRTC access server 140, to request voice content associated with the VXML URI (signals 1242 and 1244).

In response, IVR system 190 may send an HTTP GET request using the VXML URI to application server 130 via WebRTC access server 140 (signals 1246 and 1248) and application server may respond, via WebRTC access server 140, with an HTTP 200 OK message providing the requested voice content (signals 1250 and 1252). IVR system 190 may play the VXML dialog from the received voice content over the established WebRTC connection (signals 1254 and 1256). The dialog may prompt the user to make a selection and/or to provide information. The user may speak utterances, which are sent to IVR system 190 via WebRTC gateway 150 over the established WebRTC connection (signals 1258 and 1260). IVR system 190 may receive the user utterances and may perform speech recognition to match the user utterances to available user selections stored in the voice content.

Figure 13:
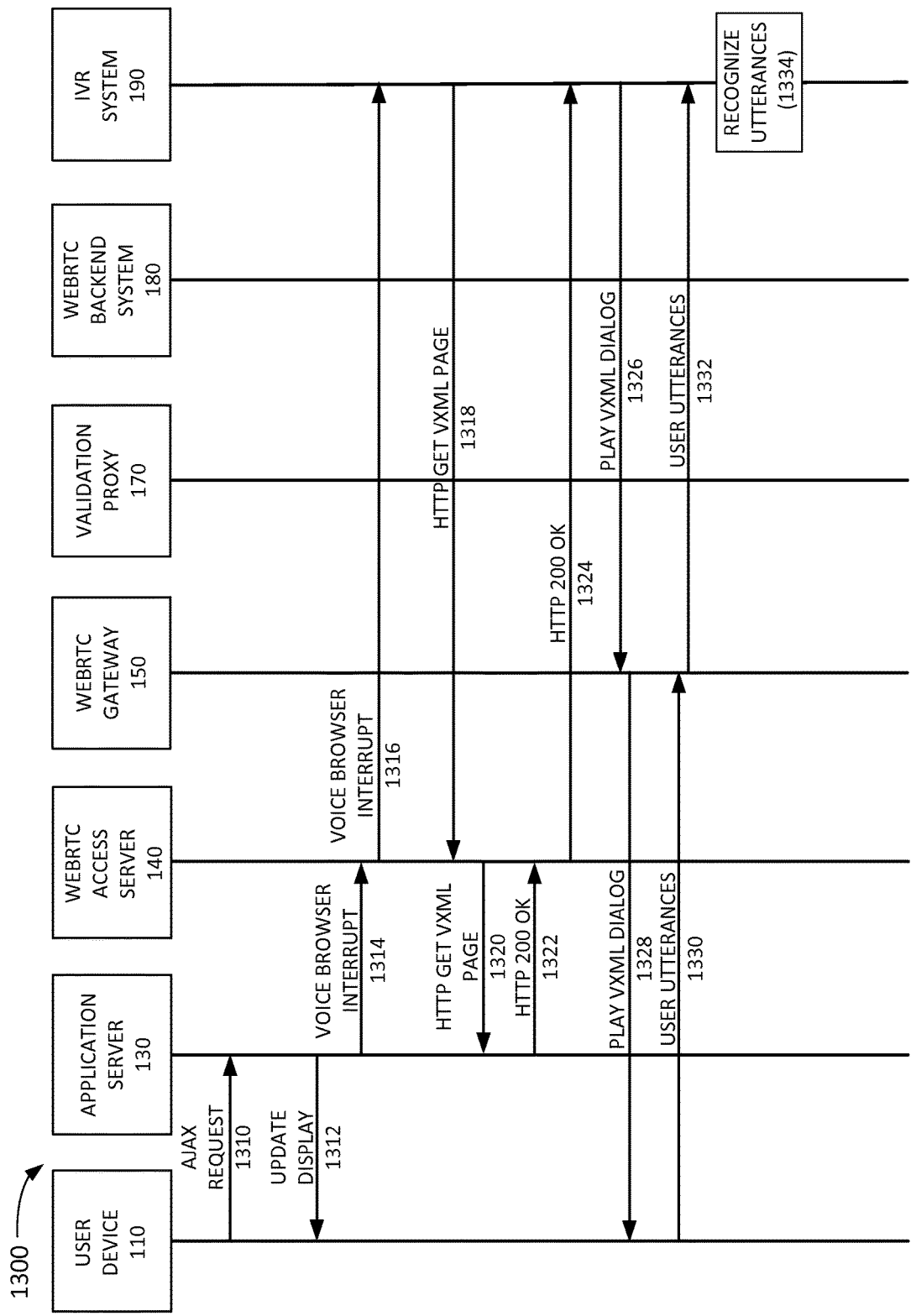
FIG. 13 is a diagram of a signal flow for processing a click from an HTML browser during a co-browsing session according to an implementation described herein.

FIG. 13 is a diagram of a signal flow 1300 for processing a click from an HTML browser during a co-browsing session according to an implementation described herein. Assume a co-browsing session is active, with an established WebRTC connection and with user device 110 running an HTML session and IVR system 190 running a voice browser session. After user device 110 receives a web page from application server 130 that is enabled for co-browsing, user device 110 may activate a fetching script that obtains and renders new web pages without reloading the currently displayed web page, thereby maintaining a WebRTC connection. When a user clicks on a link or otherwise requests a new web page, fetching script may request the web page from application server using an AJAX interface (signal 1310). In response, application server 130 may provide the requested content and user device may update the display without reloading the displayed web page (signal 1312).

Furthermore, application server 130 may determine that the AJAX request is associated with an HTML session, based on an HTML session ID included in the AJAX request, which is associated with a co-browsing session ID. Furthermore, application server 130 may determine that the requested HTML content is associated with new voice content. Therefore, application server 130 may send a voice browser interrupt to IVR system 190 via WebRTC access server 140, instructing voice browser 195 associated with the co-browsing session ID to stop processing current voice content and to request new voice content (e.g., using a specified VXML URI) associated with the HTML content requested via the AJAX interface (signals 1314 and 1316).

In response, IVR system 190 may request, via WebRTC access server 140, the new voice content with an HTTP GET request using the specified VXML URI (signals 1318 and 1320). Application server 130 may respond, via WebRTC access server 140, with an HTTP 200 ok message providing the requested voice content (signals 1322 and 1324). IVR system 190 may then play voice dialog from the received voice request over the WebRTC connection via WebRTC gateway 150 (signals 1326 and 1328). The user may respond to the voice dialog and user device 110 may send the user's utterances to IVR system 190 over the WebRTC connection via WebRTC gateway 150 (signals 1330 and 1332). IVR system 190 may receive the user utterances and may perform speech recognition on the user utterances based on voice grammars included in the received voice content (block 1334).

Figure 14:
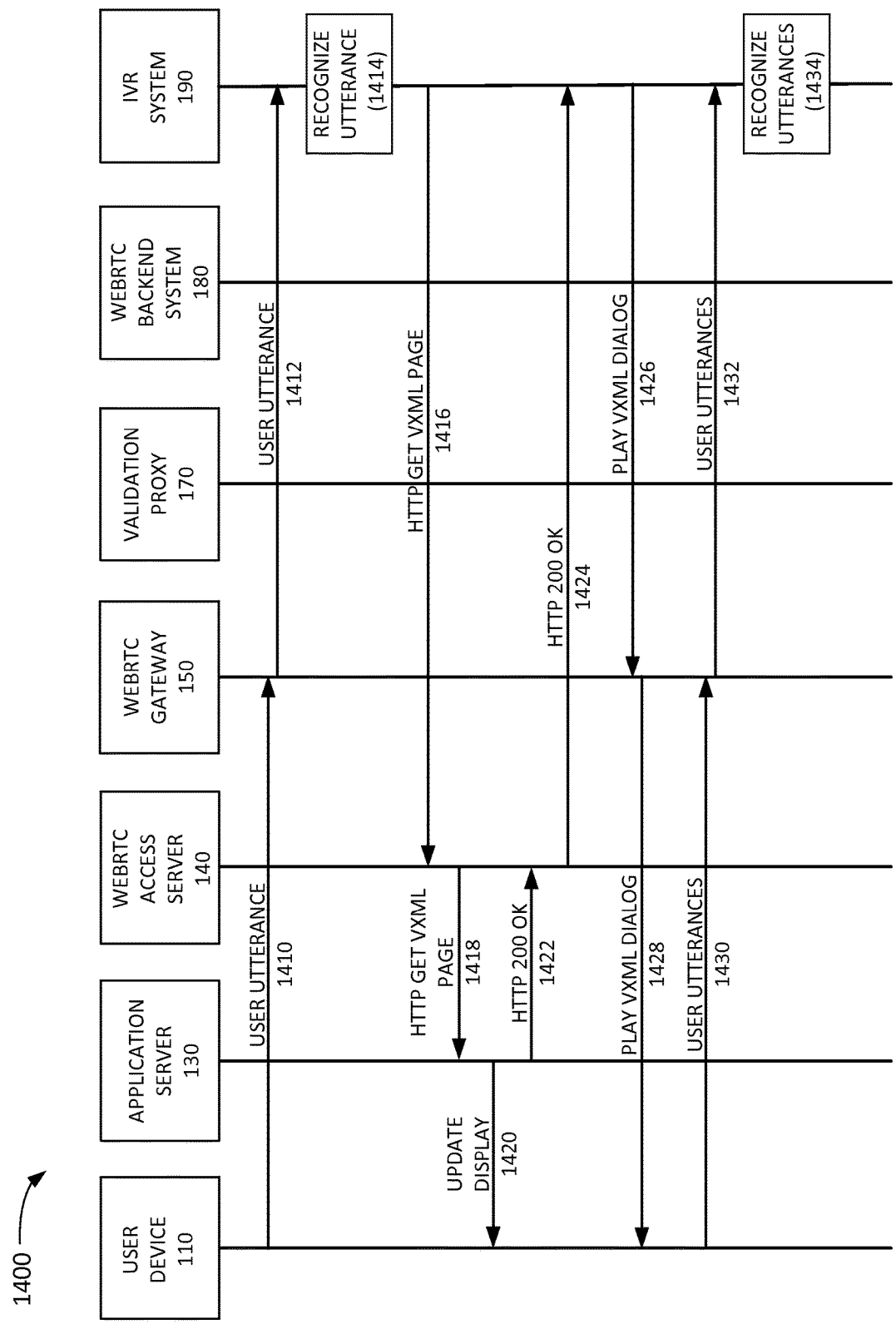
FIG. 14 is a diagram of a signal flow for processing a selection from a voice browser during a co-browsing session according to an implementation described herein.

FIG. 14 is a diagram of a signal flow 1400 for processing a selection from a voice browser during a co-browsing session according to an implementation described herein. Assume a co-browsing session is active, with an established WebRTC connection and with user device 110 running an HTML session and IVR system 190 running a voice browser session. The user may respond to voice dialog received from IVR system 190 over a WebRTC connection and user device 110 may send the user's utterance to IVR system 190 over the WebRTC connection via WebRTC gateway 150 (signals 1410 and 1412). IVR system 190 may receive the user utterances and may perform speech recognition on the user utterance based on voice grammars included in the voice content previously obtained by voice browser 195 of IVR system 190 (block 1414). Voice browser 195 may determine that the user utterance corresponds to a selection associated with particular voice content (e.g., a VXML URI). For example, the user may be presented with three options to select (e.g., return to a previous screen, proceed to a next screen, and request a customer representative) and each option may be associated with a VXML URI. Based on the user selection, voice browser 195 of IVR system 190 may send an HTTP GET request using the identified VXML URI to application server 130 via WebRTC access server 140 (signals 1416 and 1418).

Application server 130 may determine that the voice browser request is associated with a co-browsing session, identify an HTML session associated with the co-browsing session, identify HTML content associated with the requested VXML content, and identify the HTML browser session associated with the co-browsing session. Application server 130 may provide the identified HTML content to user device 110 associated with the identified HTML browser session using an AJAX interface. User device 110 may update the display without reloading the displayed web page (signal 1420).

After providing the HTML content to user device 110, application server 130 may respond, via WebRTC access server 140, to IVR system 190 with an HTTP 200 ok message providing the requested voice content (signals 1422 and 1424). IVR system 190 may then play voice dialog from the received voice request over the WebRTC connection via WebRTC gateway 150 (signals 1426 and 1428). The user may respond to the voice dialog and user device 110 may send the user's utterances to IVR system 190 over the WebRTC connection via WebRTC gateway 150 (signals 1430 and 1432). IVR system 190 may receive the user utterances and may perform speech recognition on the user utterances based on voice grammars included in the received voice content (block 1434).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7-11, and a series of signal flows have been described with respect to FIGS. 12-14, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a request for a web page that includes Hypertext Markup Language (HTML) content and voice browser content from an HTML browser running on a user device;
   generating, by the computer device, a co-browsing session identifier based on the received request;
   providing, by the computer device, a response to the HTML browser, wherein the response includes the HTML content, the generated co-browsing session identifier, and an instruction to establish a Web Real-Time Communication (WebRTC) connection with an interactive voice response (IVR) system associated with the voice browser content;
   receiving, by the computer device, an indication from the IVR system that the WebRTC connection has been established for the co-browsing session identifier;
   identifying, by the computer device, the HTML content associated with the co-browsing session identifier, in response to receiving the indication that the WebRTC connection has been established for the co-browsing session identifier;
   identifying, by the computer device, the voice browser content associated with the HTML content; and
   providing, by the computer device, the identified voice browser content to a voice browser in the IVR system.

2. The method of claim 1, further comprising:
   associating an HTML browser session identifier, associated with the HTML browser, with the co-browsing session identifier; and
   associating a Voice Extensible Markup Language (VXML) browser session identifier, associated with the voice browser, with the co-browsing session identifier.

3. The method of claim 1, wherein providing the response to the HTML browser includes:
   providing a fetching script to the HTML browser, wherein the fetching script enables the HTML browser to fetch another web page while maintaining the WebRTC connection.

4. The method of claim 1, wherein providing the response to the HTML browser includes:
   providing a WebRTC library to the HTML browser, wherein the WebRTC library enables the HTML browser to establish the WebRTC connection with the IVR system.

5. The method of claim 1, further comprising:
   receiving, from the HTML browser, a request for another web page;
   identifying the request for the other web page as being associated with the co-browsing session identifier;
   providing, to the HTML browser, HTML content associated with the other web page;
   identifying a voice browser session associated with the voice browser and the co-browsing session identifier; and
   sending a voice browser interrupt to the identified voice browser session in the IVR system, wherein the voice browser interrupt causes the IVR system to stop playback of the voice browser content and request updated voice browser content associated with the other web page.

6. The method of claim 5, further comprising:
   receiving, from the IVR system, a request for the updated voice browser content associated with the other web page;
   identifying the request for the updated voice browser content as being associated with the co-browsing session identifier;
   identifying the updated voice browser content based on the co-browsing session identifier; and
   providing the identified updated voice browser content to the IVR system.

7. The method of claim 1, further comprising:
receiving, from the voice browser in the IVR system, a request for other voice browser content;
identifying the request for the other voice browser content as being associated with the co-browsing session identifier;
identifying other HTML browser content associated with the other voice browser content;
providing the other HTML browser content to the HTML browser; and
providing the other voice browser content to the voice browser in the IVR system.

8. The method of claim 1, wherein the computer device communicates with the IVR system via a WebRTC access system.

9. A computer system comprising:
logic configured to:
receive a request for a web page that includes Hypertext Markup Language (HTML) content and voice browser content from an HTML browser running on a user device;
generate a co-browsing session identifier based on the received request;
provide a response to the HTML browser, wherein the response includes the HTML content, the generated co-browsing session identifier, and an instruction to establish a Web Real-Time Communication (WebRTC) connection with an interactive voice response (IVR) system associated with the voice browser content;
receive an indication from the IVR system that the WebRTC connection has been established for the co-browsing session identifier;
identify the HTML content associated with the co-browsing session identifier, in response to receiving the indication that the WebRTC connection has been established for the co-browsing session identifier;
identify the voice browser content associated with the HTML content; and
provide the voice browser content to a voice browser in the IVR system.

10. The computer system of claim 9, wherein the logic is further configured to:
associate an HTML browser session identifier, associated with the HTML browser, with the co-browsing session identifier; and
associate a Voice Extensible Markup Language (VXML) browser session identifier, associated with the voice browser, with the co-browsing session identifier.

11. The computer system of claim 9, wherein, when providing the response to the HTML browser, the logic is further configured to:
provide a fetching script to the HTML browser, wherein the fetching script enables the HTML browser to fetch another web page while maintaining the WebRTC connection.

12. The computer system of claim 9, wherein, when providing the response to the HTML browser, the logic is further configured to:
provide a WebRTC library to the HTML browser, wherein the WebRTC library enables the HTML browser to establish the WebRTC connection with the IVR system.

13. The computer system of claim 9, wherein the logic is further configured to:
receive, from the HTML browser, a request for another web page;
identify the request for the other web page as being associated with the co-browsing session identifier;
provide, to the HTML browser, HTML content associated with the other web page;
identify a voice browser session associated with the voice browser and the co-browsing session identifier; and
send a voice browser interrupt to the identified voice browser session in the IVR system, wherein the voice browser interrupt causes the IVR system to stop playback of the voice browser content and request updated voice browser content associated with the other web page.

14. The computer system of claim 13, wherein the logic is further configured to:
receive, from the IVR system, a request for the updated voice browser content associated with the other web page;
identify the request for the updated voice browser content as being associated with the co-browsing session identifier;
identify the updated voice browser content based on the co-browsing session identifier; and
provide the identified updated voice browser content to the IVR system.

15. The computer system of claim 9, wherein the logic is further configured to:
receive, from the voice browser in the IVR system, a request for other voice browser content;
identify the request for the other voice browser content as being associated with the co-browsing session identifier;
identify other HTML browser content associated with the other voice browser content;
provide the other HTML browser content to the HTML browser; and
provide the other voice browser content to the voice browser in the IVR system.

16. A non-transitory computer-readable memory device storing instructions executable by a processor, the non-transitory computer-readable memory device comprising:
one or more instructions to receive a request for a web page that includes Hypertext Markup Language (HTML) content and voice browser content from an HTML browser running on a user device;
one or more instructions to generate a co-browsing session identifier based on the received request;
one or more instructions to provide a response to the HTML browser, wherein the response includes the HTML content, the generated co-browsing session identifier, and an instruction to establish a Web Real-Time Communication (WebRTC) connection with an interactive voice response (IVR) system associated with the voice browser content;
one or more instructions to receive an indication from the IVR system that the WebRTC connection has been established for the co-browsing session identifier;
one or more instructions to identify the HTML content associated with the co-browsing session identifier, in response to receiving the indication that the WebRTC connection has been established for the co-browsing session identifier;
one or more instructions to identify the voice browser content associated with the HTML content; and
one or more instructions to provide the voice browser content to a voice browser in the IVR system.

17. The non-transitory computer-readable memory device of claim 16, wherein the one or more instructions to provide the response to the HTML browser further include:

one or more instructions to provide a fetching script to the HTML browser, wherein the fetching script enables the HTML browser to fetch another web page while maintaining the WebRTC connection.

18. The non-transitory computer-readable memory device of claim 16, wherein the one or more instructions to provide the response to the HTML browser further include:
one or more instructions to provide a WebRTC library to the HTML browser, wherein the WebRTC library enables the HTML browser to establish the WebRTC connection with the IVR system.

19. The non-transitory computer-readable memory device of claim 16, further comprising:
one or more instructions to receive, from the HTML browser, a request for another web page;
one or more instructions to identify the request for the other web page as being associated with the co-browsing session identifier;
one or more instructions to provide, to the HTML browser, HTML content associated with the other web page;
one or more instructions to identify a voice browser session associated with the voice browser and the co-browsing session identifier; and
one or more instructions to send a voice browser interrupt to the identified voice browser session in the IVR system, wherein the voice browser interrupt causes the IVR system to stop playback of the voice browser content and request updated voice browser content associated with the other web page.

20. The non-transitory computer-readable memory device of claim 16, further comprising:
one or more instructions to receive, from the voice browser in the IVR system, a request for other voice browser content;
one or more instructions to identify the request for the other voice browser content as being associated with the co-browsing session identifier;
one or more instructions to identify other HTML browser content associated with the other voice browser content;
one or more instructions to provide the other HTML browser content to the HTML browser; and
one or more instructions to provide the other voice browser content to the voice browser in the IVR system.

* * * * *